United States Patent
Barham et al.

(10) Patent No.: US 10,373,053 B2
(45) Date of Patent: Aug. 6, 2019

(54) STREAM-BASED ACCELERATOR PROCESSING OF COMPUTATIONAL GRAPHS

(71) Applicant: Google LLC, Mountain View, CA (US)

(72) Inventors: Paul Ronald Barham, San Francisco, CA (US); Vijay Vasudevan, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/965,670

(22) Filed: Apr. 27, 2018

(65) Prior Publication Data

US 2018/0247196 A1    Aug. 30, 2018

Related U.S. Application Data

(63) Continuation of application No. 15/336,673, filed on Oct. 27, 2016.
(Continued)

(51) Int. Cl.
*G06E 1/00* (2006.01)
*G06E 3/00* (2006.01)
(Continued)

(52) U.S. Cl.
CPC ............. *G06N 3/08* (2013.01); *G06F 9/5038* (2013.01); *G06F 9/5066* (2013.01);
(Continued)

(58) Field of Classification Search
CPC ... G06F 17/30958; G06F 9/5038; G06N 3/08; G06T 1/20
See application file for complete search history.

(56) References Cited

U.S. PATENT DOCUMENTS

2006/0095721 A1   5/2006  Biles et al.
2006/0095722 A1   5/2006  Biles et al.
(Continued)

OTHER PUBLICATIONS

International Search Report and Written Opinion issued in International Application No. PCT/US2016/059334, dated Feb. 16, 2017, 15 pages.
(Continued)

*Primary Examiner* — Luis A Sitiriche
(74) *Attorney, Agent, or Firm* — Fish & Richardson P.C.

(57) ABSTRACT

Methods, systems, and apparatus, including computer programs encoded on computer storage media, for receiving, by a computational graph system, a request to process a computational graph; obtaining data representing a subgraph of the computational graph, the computational graph comprising a plurality of nodes and directed edges, wherein each node represents a respective operation, wherein each directed edge connects a respective first node to a respective second node, the subgraph assigned to a first device by a placer in the computational graph system; determining that the first device comprises a hardware accelerator having a plurality of streams; in response to determining, generating instructions that when executed by the first device cause the first device to: assign the operation represented by each node in the subgraph to a respective stream; and perform the operations represented by the nodes in the subgraph in accordance with the assignment.

27 Claims, 4 Drawing Sheets

Related U.S. Application Data (60) Provisional application No. 62/247,703, filed on Oct. 28, 2015, provisional application No. 62/253,046, filed on Nov. 9, 2015.

(51) Int. Cl.
| | | |
|---|---|---|
| *G06F 15/18* | (2006.01) | |
| *G06G 7/00* | (2006.01) | |
| *G06N 3/08* | (2006.01) | |
| *G06N 20/00* | (2019.01) | |
| *G06F 9/50* | (2006.01) | |
| *G06N 3/063* | (2006.01) | |
| *G06N 3/04* | (2006.01) | |

(52) U.S. Cl.
CPC .......... *G06N 3/0454* (2013.01); *G06N 3/063* (2013.01); *G06N 3/084* (2013.01); *G06N 20/00* (2019.01)

(56) References Cited

U.S. PATENT DOCUMENTS

| | | | |
|---|---|---|---|
| 2014/0282180 A1* | 9/2014 | Orofino | G06F 3/0484 715/771 |
| 2015/0007182 A1 | 1/2015 | Rossbach et al. | |

OTHER PUBLICATIONS

International Preliminary Report on Patentability issued in International Application No. PCT/US2016/059334, dated Jan. 16, 2018, 26 pages.

\* cited by examiner

STREAM-BASED ACCELERATOR PROCESSING OF COMPUTATIONAL GRAPHS

CROSS-REFERENCE TO RELATED APPLICATIONS

This application is a continuation of U.S. application Ser. No. 15/336,673, entitled STREAM-BASED ACCELERATOR PROCESSING OF COMPUTATIONAL GRAPHS, filed on Oct. 27, 2016, which claims the benefit under 35 U.S.C § 119(e) of the filing date of U.S. Patent Application No. 62/247,703, entitled PROCESSING COMPUTATIONAL GRAPHS, filed on Oct. 28, 2015, and claims the benefit of U.S. Patent Application No. 62/253,046, entitled PROCESSING COMPUTATIONAL GRAPHS, filed on Nov. 9, 2015. The disclosures of the prior applications are considered part of and are incorporated by reference in the disclosure of this application.

BACKGROUND

This specification relates to processing computational graphs representing neural networks using an accelerator device, e.g., a graphical processing unit (GPU).

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

In systems that exist, the operations of computational graphs can be processed by an individual device. In some implementations, the device is a GPU. The device can have a processor that performs operations, e.g., generating outputs at a layer from inputs, and stores outputs from the operations in memory. Due to the large number and size of operations generally required to generate the outputs in the computational graph, one device can take a significant amount of time to process the operations of the graph.

SUMMARY

In general, this specification describes a system for processing subgraphs of a computational graph using a stream-based accelerator device, e.g., a GPU.

In general, one innovative aspect of the subject matter described in this specification can be embodied in methods that include the actions of receiving, by a computational graph system, a request to process a computational graph; obtaining data representing a subgraph of the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, the subgraph assigned to a first device by a placer in the computational graph system; determining that the first device comprises a graphical processing unit having a plurality of streams; in response to determining that the first device comprises a graphical processing unit having a plurality of streams, generating instructions that when executed by the first device cause the first device to: assign the operation represented by each node in the subgraph to a respective stream in the plurality of streams of the graphical processing unit; and perform the operations represented by the nodes in the subgraph in accordance with the assignment; and providing the instructions and the data to the first device.

Implementations can include one or more of the following features. The request specifies identifying one or more particular outputs from one or more respective nodes in the subgraph, further comprising: receiving, from the first device, the one or more particular outputs; and providing the one or more particular outputs to the client. The instructions further cause the first device to store the one or more particular outputs in memory of the first device. The operations for the subgraph comprise partial inference or training computations for a neural network. Analyzing the subgraph to identify a group of nodes in the subgraph in a chain structure; wherein the instructions cause the first device to assign the group of nodes to one stream. The assigning comprises: analyzing the subgraph to identify a first node in the subgraph has a plurality of directed edges as outputs; wherein the instructions cause the first device to assign, for each of the directed edges, a node to which the directed edge points to a unique stream of the graphical processing unit. The instructions cause the first device to determine, for each node, a respective amount of memory resources in the graphical processing unit consumed by the operation represented by the node based on the directed edges to the node, wherein the assigning is based at least on the respective amount of memory resources. The instructions cause the first device to determine a particular operation represented by a node has finished at a particular stream; in response to determining the particular operation has finished: determine a first amount of memory consumed by the particular operation that will be freed; determine, for each of a group of unassigned nodes, a respective estimated amount of memory consumed by the unassigned node; determine, from the group of unassigned nodes, a first unassigned node with the estimated amount of memory that maximizes usage of the first amount of memory; and assign an operation represented by the first unassigned node to the particular stream.

Another innovative aspect includes the actions of receiving, by a graphical processing unit having a plurality of streams, data representing a subgraph of the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, the subgraph assigned to a graphical processing unit by a placer in a computational graph system; assigning the operation represented by each node in the subgraph to a respective stream in the plurality of streams of the graphical processing unit; and performing the operations represented by the nodes in the subgraph in accordance with the assignment.

Implementations can include one or more of the following features. Receiving a request identifying one or more particular outputs from one or more respective nodes in the subgraph; and providing the one or more particular outputs to the client. Receiving data identifying a group of nodes in the subgraph in a chain structure; and assigning the group of nodes to one stream. The assigning comprises: receiving data identifying a first node in the subgraph having a plurality of directed edges as outputs; and assigning, for each of the directed edges, a node to which the directed edge points to a unique stream of the graphical processing unit.

Determining, for each node, a respective amount of memory resources in the graphical processing unit consumed by the operation represented by the node based on the directed edges to the node, wherein the assigning is based at least on the respective amount of memory resources. Determining a particular operation represented by a node has finished at a particular stream; in response to determining the particular operation has finished, determining a first amount of memory consumed by the particular operation that will be freed; determining, for each of a group of unassigned nodes, a respective estimated amount of memory consumed by the unassigned node; determining, from the group of unassigned nodes, a first unassigned node with the estimated amount of memory that maximizes usage of the first amount of memory; and assigning an operation represented by the first unassigned node to the particular stream.

Particular embodiments of the subject matter described in this specification can be implemented so as to realize one or more of the following advantages. Operations, e.g., an operation to generate an inference from an input, of a neural network can be represented as a computational graph of nodes and directed edges. A system processes this computational graph representation to efficiently perform the operations. The system achieves this efficiency because the computational graph has multiple streams. Using multiple streams can allow logically independent operations to be reordered or executed concurrently. When the system has a goal of lowering end-to-end latency for a whole computation, the example system may reorder logically independent operations. When the system has a goal to achieve higher throughput, the example system may execute operations simultaneously. The computational graph can be more easily partitioned for parallel operations than the conventional representation. By way of illustration, subgraphs of the computational graph can be assigned to unique devices, each of which performs operations in the respective subgraph, to reduce an overall time required to perform operations of the neural network.

A device to which a subgraph is assigned can be a GPU. The subgraph can be partitioned into multiple streams of the GPU to more efficiently perform the operations of the subgraph. The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a computational graph system that performs operations represented by a computational graph in a distributed manner.

The computational graph includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric values or other values, e.g., strings, having a specific order that corresponds to the dimensionality of the array. For example, a scalar value is a 0th-order tensor, a vector of numeric values is a 1st-order tensor, and a matrix is a 2nd-order tensor.

In some implementations, the operations represented in the computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of the parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. In some implementations, the weight tensor is associated with the shared persistent state of the model. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

Representing a neural network as a computational graph provides for a flexible and granular way to efficiently implement the neural network, especially if the operations for the neural network are distributed across multiple devices with different hardware profiles.

Figure 1:
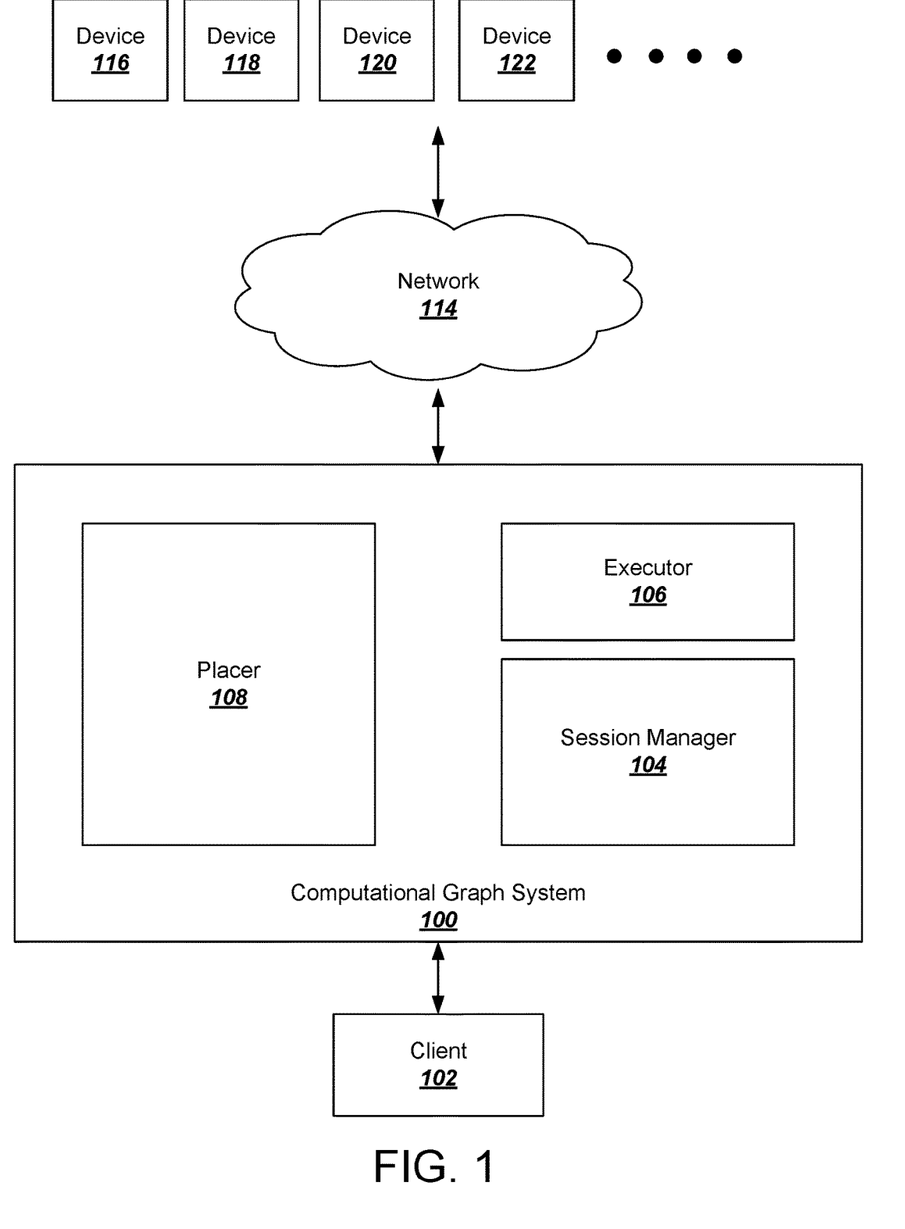
FIG. 1 illustrates an example computational graph system for distributing operations for neural networks represented as computational graphs.

FIG. 1 illustrates an example computational graph system 100 for distributing operations for neural networks represented as computational graphs. The system 100 is an example of a system implemented as computer programs on one or more computers in one or more locations, in which the systems, components, and techniques described below can be implemented.

A user of a client 102 can request actions be performed on a computational graph representing a neural network. For example, a client can register a graph with the session manager, feed data input into the graph, or evaluate one or more of the outputs of a graph. The client 102 can be an application running on a computer.

As part of the request, the client 102 provides data identifying a computational graph to the system 100 and specifies types of actions to be performed on the computational graph.

For example, the request can identify a computational graph representing an inference for a particular neural network and can identify an input on which the inference should be performed.

As another example, the request can identify a computational graph representing a training procedure for a particular neural network and can identify an input, such as training data, on which the training should be performed. In this example, when receiving a request to process a computation graph representing a training procedure, the system 100 can determine modified values for parameters for one or more edges of the computational graph, e.g., using conventional backpropagation or other neural network training techniques. The system 100 can store the modified parameters in memory of a device, and an executor 106 can retrieve and store, at the system 100, addresses of the modified weights. Upon further requests from the client 102 for inference, training, or other operations requiring the modified weights, the system 100 can access the modified weights using the addresses.

In some cases, the request may specify a response that should be transmitted in response to the request. For example, for a neural network training request, the client 102 can request an indication that the requested neural network training operations have been completed and, optionally, trained values of the parameters of the neural network or an indication of a memory location from which the trained values can be accessed by the client 102. As another example, for a neural network inference request, the client 102 can request output values that represent an inference operation from one or more particular nodes of the computational graph.

The system 100 performs the operations to generate the particular output by partitioning the operations represented by the computational graph across multiple devices 116-122. The system 100 partitions the operations to the multiple devices 116-122 over a data communication network 114, e.g., local area network (LAN) or wide area network (WAN). The devices 116-122 perform the operations and, if applicable, return a respective output or indication to the system 100, which can return the requested output or indication to the client 102.

Any devices performing neural network operations, e.g., devices 116-122, can include a memory, e.g., a random access memory (RAM), for storing instructions and data and a processor for executing stored instructions. Generally, each device is a hardware resource that performs operations independent of other devices. For example, each device can have its own processing unit. The devices can be Graphical Processing Units (GPUs), Central Processing Units (CPUs), or other accelerators. By way of illustration, one machine can host one or more devices, e.g., multiple CPUs and GPUs.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

A session manager 104 in the system 100 receives a request from the client 102 to start a session during which operations of the computational graph are performed. The session manager 104 manages the set of devices, e.g., devices 116-122, that can perform operations of the computational graph, and can provide a placer 108 with the set of devices that are available to perform operations.

The placer 108 determines, for each operation to be performed in the computational graph, a respective target device, e.g., device 116, that performs the operation, and in some implementations, a time for the respective target device to perform the operation. The placer 108 performs optimal device assignment by knowing how long an operation will take on each available device given the size of the input data. The placer 108 obtains the estimate of processing time using measurements or predictive performance models. Some operations can be performed in parallel while other operations require prior operations in the computational graph to be completed, e.g., the other operations process, as inputs, outputs of the prior operations.

After the devices perform the operations allocated by the placer 108 to generate outputs, the executor 106 can retrieve the outputs. The executor 106 can generate an appropriate response to the request, e.g., an output or an indication that the processing has been completed. Then, the executor 106 can return the response to the client 102. Although FIG. 1 illustrates one executor 106, in one implementation, there is an executor per device. This executor issues operations to the device when they become runnable (i.e., all of their inputs have been computed). This implementation also has a graph manager that partitions a graph to run on multiple devices by invoking the placer 108 and creates the necessary executors.

The session manager 104 also provides sets of operations to be performed in the computational graph to the executor 106. The executor 106 periodically retrieves runtime statistics from the devices 116-122 related to graph execution of operations. The executor 106 provides the runtime statistics to the placer 108, which can re-optimize placement and scheduling of further operations.

Figure 2:
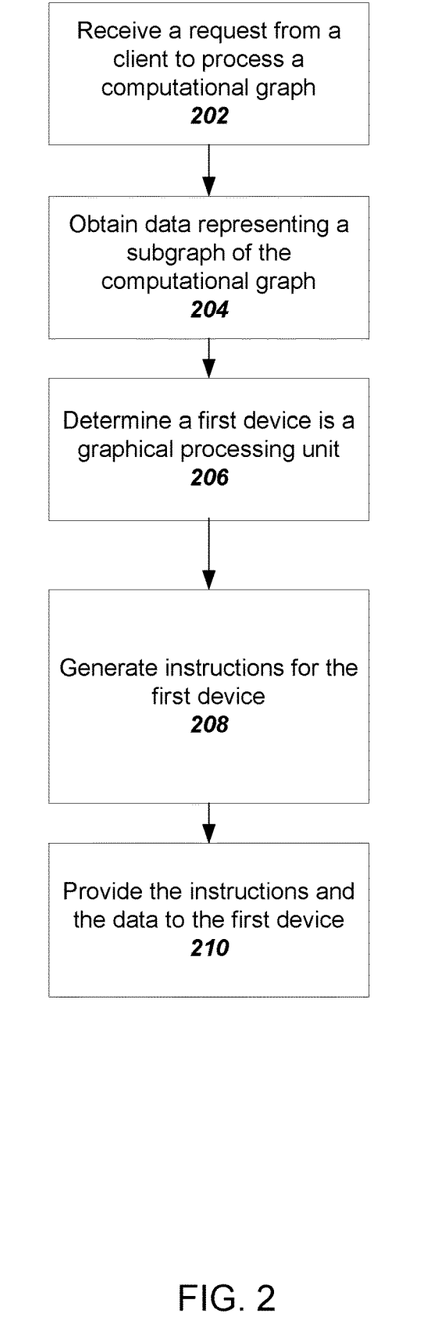
FIG. 2 is a flow diagram of an example process for processing a subgraph of a computational graph using a GPU.

FIG. 2 is a flow diagram of an example process 200 for processing a subgraph of a computational graph using a GPU. For convenience, the process 200 will be described as being performed by a system of one or more computers located in one or more locations. For example, a computational graph system, e.g., the computational graph system 100 of FIG. 1, appropriately programmed, can perform the process 200.

The system receives a request from a client to process a computational graph (step 202). For example, the request can be a request to perform a neural network inference represented by the computational graph on a specified input, a request to perform neural network training operations represented by the computational graph on a specified set of training data, or a request to perform other neural network operations represented by the computational graph, as described above with reference to FIG. 1.

In some cases, a computational graph is sent with the request from the client. In other cases, the request identifies the computational graph and the system retrieves the data representing the identified graph from memory.

The system can partition the computational graph into multiple subgraphs. In some implementations, the subgraphs are specified by the client sending the request, and the system partitions the computational graph according to the specifications. In some other implementations, the system partitions the computational graph such that each subgraph requires a similar amount of resources for performing operations compared to the other subgraphs.

The system can assign each subgraph to an available device, e.g., using placer 108 of FIG. 1.

The system obtains data representing a particular subgraph of the computational graph (step 204) from the partitioned computational graph. The data can be obtained from a database or memory of the system. By way of illustration, operations of the particular subgraph represent partial inference or training computations.

The system determines that a device to which the subgraph is assigned is a graphical processing unit or other hardware accelerator device having multiple streams (step 206). By way of illustration, the system can assess whether the device is a GPU with multiple streams by requesting a type of the device from a resource manager that manages devices to be assigned to the computational graph. Each stream is an independent hardware queue whose operations are processed in order.

The system generates instructions that, when executed by the device, cause the device to perform particular operations (step 208). In particular, the instructions cause the device to assign the operation represented by each node in the subgraph to a respective stream of the device.

An example system may assign computations of some hardware accelerators to streams in a particular way (e.g., if one operation executes on stream A, then a later, related operation must also execute on stream A.) For example, a first operation may be stateful and execute on stream A. By executing, the first operation may change the internal state of the hardware in a way that must happen before a second operation executes. The second operation may then execute on stream A after the first operation is complete.

In some implementations, two internal hardware resources cannot be used simultaneously and therefore need to be serialized.

Generally, the device assigns operations that do not depend on each other to different streams. By assigning operations that do not depend on each other to different streams, the hardware does not need to know how long an operation will take and can choose from a number of available operations to execute the first one that is ready to execute without expensive host intervention.

The instructions also cause the device to perform the operations represented by the nodes in the subgraph in accordance with the assignment. When operations are assigned to a particular stream, the operations are queued. The device can perform operations in a first-in-first-out (FIFO) manner. Thus, if the device only has one stream, the operations assigned to the device are performed serially. If the device has multiple streams, the operations in different streams can be performed in parallel and reordered with respect to each other, while the operations within a given stream are performed serially. Performing operations using multiple streams decreases a total time to perform the operations of the subgraph. This is described further below with reference to FIGS. 3 and 4.

The system provides the instructions and the data to the device (step 210). In some implementations, the system sends the device a request to start the operations. The device receives the request and in response, executes the instructions received from the system.

Figure 3:
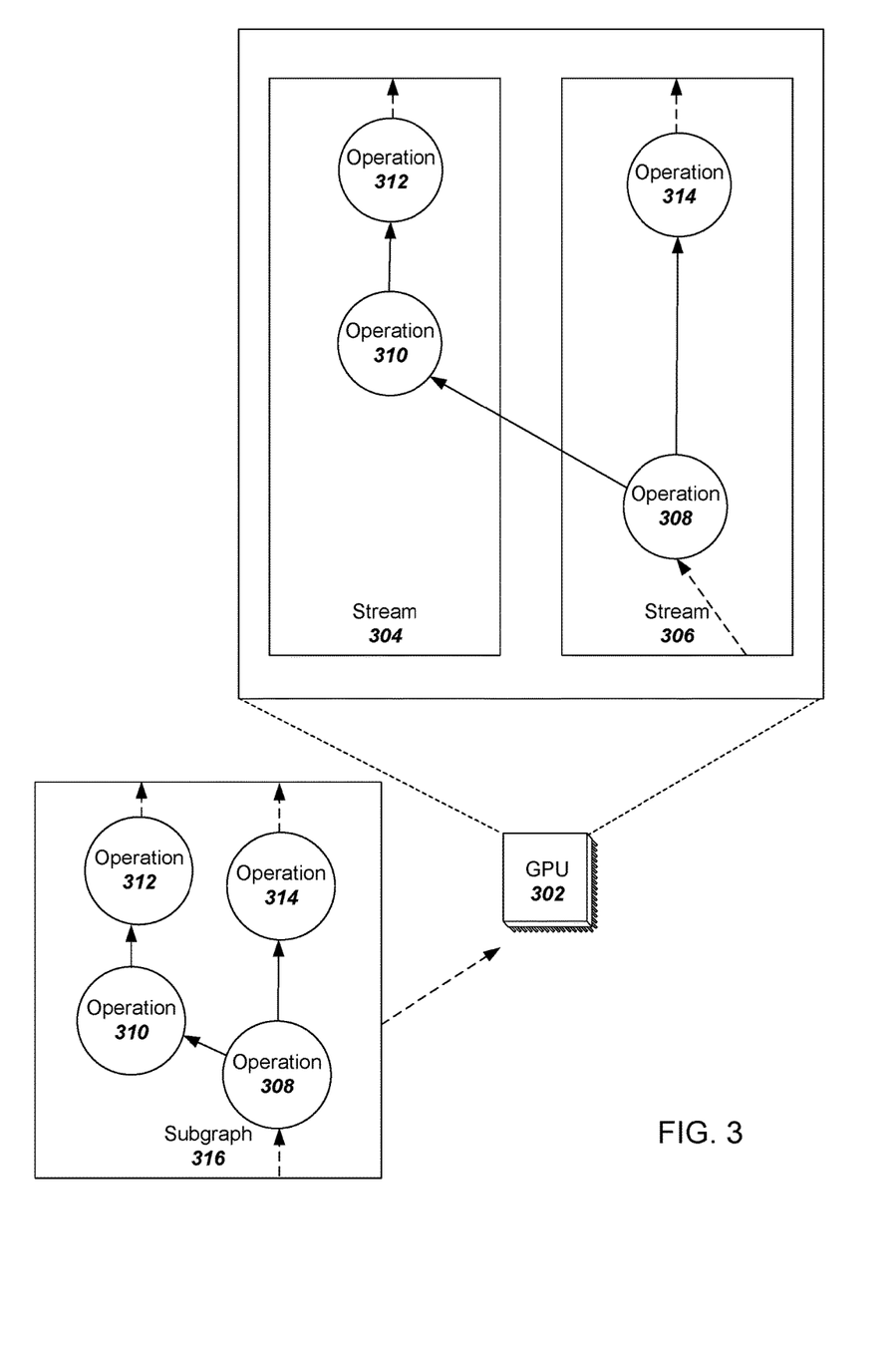
FIG. 3 illustrates an example subgraph of a computational graph being processed by a GPU.

FIG. 3 illustrates an example subgraph 316 of a computational graph being processed by an Accelerator 302. The subgraph 316 has nodes 308-314, each of which represent an operation to be performed by the Accelerator 302. A computational graph system, e.g., the system 100 of FIG. 1, assigned the subgraph 316 to the Accelerator 302.

The Accelerator 302 has two streams 304 and 306. The streams share utilization of the Accelerator 302. In GPU, streams may be symmetric, meaning that all operations can be performed on any stream. This symmetry may not be available of all accelerator devices. For example, on specific accelerator devices certain streams must be used to perform operations that copy data between host and device memory.

The computational graph system can analyze the subgraph 316 to determine how the subgraph 316 is assigned to the multiple streams 304 and 306. In some implementations, the system generates instructions that causes the Accelerator 302 to assign the nodes of the subgraph 316 in a way that minimizes the number of times a directed edge connects to different streams. There may be a performance cost to enforcing dependencies between streams. Ordering instructions has some overhead cost. Every ordering dependency reduces the number of possible execution orderings available to the device, reducing scheduling flexibility. Each time a directed edge from a first stream connects to a second stream, the second stream waits for the operation with the directed edge from the first stream to the second stream to complete processing. Waiting can cause the second stream to remain idle, which causes the GPU to be inefficiently utilized.

In some implementations, the system generates instructions that causes the Accelerator 302 to assign the nodes of the subgraph 316 based on characteristics of the Accelerator 302. For example, the Accelerator 302 has a fixed number of streams, i.e., streams 304 and 306. The system can assign the nodes so each stream will be similarly utilized by the Accelerator 302. For accelerators that are GPUs, all streams share a single large pool of threads.

Some streams also perform particular operations that other streams do not. For example, stream 306 can perform direct memory access (DMA) operations while stream 304 does not. Thus, the system can analyze each node to determine a type of operation represented by the node, and the system can assign the node to a stream that is able to perform the type of operation. In GPUs, the main congested resources are DMA engines that copy data between hosts and device memory. DMA engines can be used by any stream. If one stream is executing a DMA operation, the stream cannot simultaneously execute a computation. An example system therefore ensures that at least one other stream has some compute work to execute at the same time. The system can analyze the subgraph to identify, and thus, generate instructions that causes a software module or driver that manages assigning operations to assign nodes by following two general rules. First, the system tries to assign nodes arranged in a chain structure to the same stream. Nodes in a chain structure are nodes that are connected to each other by following one directed edge from node to node. Thus, a node in the chain must wait for operations at previous nodes in the chain to finish computing before computing its own operation. Assigning chains of nodes is not always possible since branching and merging occur in the graph, e.g., from shared input variables or common subexpressions.

Second, the system can choose to generate instructions that cause the Accelerator 302 to assign multiple nodes that each receive input from one node to unique streams. That is, if a first node has multiple outputs to multiple different nodes, the system assigns each of the different nodes to a unique stream. Each of the different nodes do not have data dependence on any of the other different nodes, and therefore, improve efficiency when operating on disjoint streams.

By way of illustration, the Accelerator 302 receives the subgraph 316. The instructions received by the system cause the Accelerator 302 to assign the initial node 308 to a first stream 306. The initial node 308 has two outputs—one directed edge to node 310 and one directed edge to node 314. Therefore, using the second rule, the instructions cause the Accelerator 302 to assigns nodes 310 and 314 to different streams. Node 312 also only receives, as input, an output of the node 310. Therefore, using the first rule, the system assigns node 312 to the same stream, i.e., stream 304, as the node 310.

As described above, streams are hardware queues whose operations are performed in order. Thus, the order in which the Accelerator 302 assigns nodes to streams matters. The Accelerator 302 assigns nodes to streams in an order of the direction of data flow in the subgraph. That is, the Accelerator 302 identifies one or more initial nodes of the subgraph and assigns the one or more initial nodes. Then, the Accelerator 302 follows directed edges that are outputs of the one or more initial nodes to identify subsequent nodes, and the Accelerator 302 assigns the subsequent nodes to respective streams. The Accelerator 302 continues assignment of nodes until each node in the subgraph is assigned. As a result of assigning nodes in this order, operations within a given stream will also be performed in the order in which the operations were assigned, as described above. When the inputs of an operation A are produced on different streams, it is necessary to ensure that they have all been computed before operation A is executed. The execution on the stream to which operation A is assigned should be stalled until all of the inputs to operation A have been computed. The exact stalling mechanism is device specific. For GPU devices, an event can be created for each of the input streams and instructions can be added to each stream to signal the event. For each input, an instruction can also be added to the stream on which A is assigned in order for the operation to wait for the relevant event in order to execute. In cases where one or more of the inputs for operation A are computed on the same stream as operation A, dataflow dependency instructions can be safely deleted, leading to better performance. Within a given stream, operations represented by nodes assigned to the given stream that generate an output that is used as input by operations represented by one or more other nodes assigned to the given stream will have been already computed or scheduled to be computed when the Accelerator 302 performs the operations represented by the one or more other nodes.

Continuing with the illustration above, stream 304 is assigned node 310 and then assigned node 312 because data flows from the node 310 to the node 312. When executing operations in the stream, the Accelerator 302 first executes operations represented by the node 310 and then executes operations represented by the node 312.

After the final nodes, i.e., nodes 312 and 314, performs operations, the Accelerator 302 return the outputs of the nodes or an indication the operations have completed to the system. In an example system, there is a special 'send' node that copies the computation results back from the memory of the Accelerator 302 into the host memory where it can be handed to a different device by a receive node or returned to the client in a remote procedure call (RPC) response. The system can then, if necessary, return the output or the indication to the client.

Another implementation of assigning nodes to streams will be described further below with reference to FIG. 4.

Figure 4:
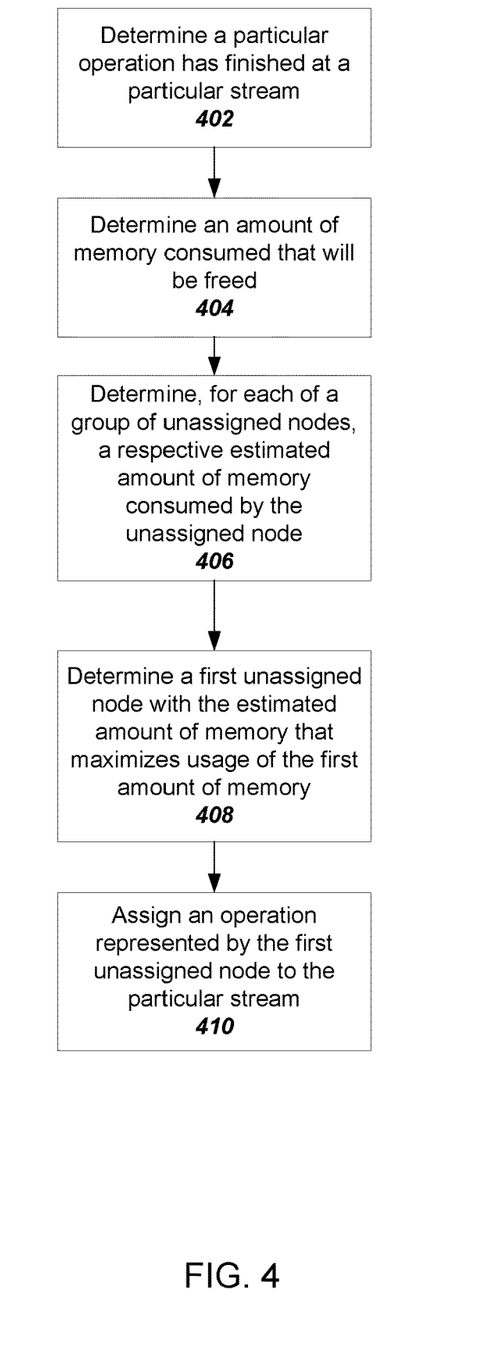
FIG. 4 is a flow diagram of an example process for assigning nodes to streams.

FIG. 4 is a flow diagram of an example process 400 for assigning subgraphs to devices. For convenience, the process 400 will be described as being performed by a system, e.g., a GPU. For example, a GPU can receive instructions generated by a computational graph system, e.g., the computational graph system 100 of FIG. 1, that, when executed, cause the GPU to perform the process 400.

The system can assign a particular node to a stream based on an amount of memory resources consumed by the node or by previously assigned nodes. For example, the system can calculate a dimension of a tensor on each directed edge to and from each node of the subgraph. The dimensions of the tensors indicate a size of memory that would be consumed by a device to perform an operation. The system may need to calculate all dimensions of a tensor in order to determine the size. The system can then assign particular nodes with tensors consuming a particular size of memory to devices having the particular size of memory.

In particular, when the device performs the operation, the software driver or executor allocates memory to store any inputs as well as any outputs computed as a result of the operation. Because the amount of memory on the device is limited, the device frees memory when memory is no longer used.

By way of illustration, the system determines whether an operation represented by a node has finished at a particular stream (step 402). For example, the system can periodically poll streams to determine whether the operation in the particular stream has finished. The stream may support an action that allows the host to determine how far execution has progressed through the list of operations in the stream. In some implementations, events, or markers, can signal how far execution has progressed. When an event occurs, the event can be added to a special hardware operation queue in the stream. The host can poll this queue in order to determine which operations have occurred. Other stream implementations may only allow the host to determine when all enqueued operations are complete. Alternatively or additionally, the hardware can provide an interrupt or callback when the stream reaches a certain point.

When the operation has finished, the system can determine memory used for inputs to the operation can be freed for use in other operations. The system does not free memory used for outputs of the operation because the outputs may be used in a subsequent node.

Thus, the system determines an amount of memory consumed that will be freed (step 404). The system can send a request to the software driver or executor to identify the size of memory that will be freed.

In some implementations, an example system allows the use of remote direct memory access (RDMA) network interfaces that remote machines can use to directly transfer data into the memory of a hardware accelerator at an arbitrary point in time. This memory must not be in use by any other operation running on any stream. The example system may not need to know precisely how far operations on each stream has progressed. However, the system should keep track of memory known not to be in use by any stream. This free memory can then be used for RDMA.

The system determines, for each of a group of unassigned nodes, a respective estimated amount of memory consumed by the unassigned node (step 406). The unassigned nodes can include nodes that receive inputs from the node whose operation has completed. The unassigned nodes can also include nodes that are independent from the node whose operation has completed but still need to be processed by the accelerator. The estimated amount of memory can be determined by evaluating dimensions of the respective tensors to the unassigned nodes, as described above.

The system determines, from the group of unassigned nodes, a first unassigned node that represents an operation, which when executed on a stream by the accelerator, maximizes usage of the amount of memory that will be freed (step 408). If an operation represented by an unassigned node requires more memory to execute than the amount of memory that will be free, the unassigned node will not be assigned to the stream. If a first and second operation require a respective estimated amount of memory less than or equal to the amount of memory that will be free, the system selects the operation that maximizes usage of the amount of memory that will be freed. In other words, in this case, the system determines the node representing the selected operation as the first unassigned node. An example system does not enqueue an operation on the stream until it can determine which regions of accelerator memory will be used to hold the temporary working space and outputs of the operation. In the event that memory is scarce, an example system may choose to enqueue operations that require smaller amounts of memory to execute or to preferentially enqueue operations that will consume large input tensors allowing them to be deallocated.

The system assigns an operation represented by the first unassigned node to the particular stream (step 410). The system can then cause the particular stream to perform the operation, and the system can continue operating as described above with reference to FIGS. 2-3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for distributing a computation represented by a computational graph over a plurality of devices including a stream-based accelerator device and performing the computation including performing the computation represented by a subgraph of the computational graph on streams of the stream-based accelerator device, the method comprising:

receiving, by a computational graph system, a request to perform a computation represented by a computational graph;

obtaining data representing multiple subgraphs of the computational graph, the computational graph comprising a plurality of nodes and directed edges, wherein each node represents a respective operation, wherein each directed edge connects a respective first node to a respective second node that represents an operation that receives, as input, an output of an operation represented by the respective first node;

assigning the multiple subgraphs to respective devices of a plurality of devices, including assigning a first subgraph to a first device by a placer in the computational graph system;

determining that the first device comprises a hardware accelerator having a plurality of streams, wherein each stream is an independent hardware queue that performs operations assigned to the stream in the order assigned;

in response to determining that the first device comprises a hardware accelerator having a plurality of streams, generating instructions that when executed by the first device cause the first device to:

assign the operation represented by each node in the first subgraph to a respective stream in the plurality of streams of the hardware accelerator, including identifying two operations that do not depend on each other and assigning the two operations to different streams, and assigning to a single stream a first operation that changes an internal state of the hardware in a way that must happen before a second operation executes and assigning the second operation to be performed in the single stream after the first operation is complete; and perform the operations represented by the nodes in the first subgraph in accordance with the assignment;

providing the instructions and the data to the first device;

sending to the first device a request causing the first device to perform the operations represented by the nodes in the first subgraph;

obtaining from the first device outputs of operations performed by the first device;

causing the other devices of the plurality of devices to perform the operations of the subgraphs assigned to the other devices; and responding to the request to perform the computation with one or more outputs obtained from the plurality of devices.

2. The method of claim 1, wherein the request specifies identifying one or more particular outputs from one or more respective nodes in the subgraph, further comprising:

receiving, from the first device, the one or more particular outputs; and providing the one or more particular outputs to the client.

3. The method of claim 1, wherein the instructions further cause the first device to store the one or more particular outputs in memory of the first device.

4. The method of claim 1, wherein the operations for the first subgraph comprise partial inference or training computations for a neural network.

5. The method of claim 1, further comprising:

analyzing the first subgraph to identify a group of nodes in the first subgraph in a chain structure;

wherein the instructions cause the first device to assign the group of nodes to one stream.

6. The method of claim 1, wherein the assigning comprises:

analyzing the first subgraph to identify a first node in the first subgraph having a plurality of directed edges as outputs;

wherein the instructions cause the first device to assign, for each of the directed edges, a node to which the directed edge points to a disjoint stream of the hardware accelerator.

7. The method of claim 1, wherein the instructions cause the first device to determine, for each node, a respective amount of memory resources in the hardware accelerator consumed by the operation represented by the node based on the directed edges to the node, wherein the assigning is based at least on the respective amount of memory resources.

8. The method of claim 1, wherein the instructions cause the first device to determine a particular operation represented by a node has finished at a particular stream;

in response to determining the particular operation has finished:

determine a first amount of memory consumed by the particular operation that will be freed;

determine, for each of a group of unassigned nodes, a respective estimated amount of memory consumed by an operation that is represented by the unassigned node;

determine, from the group of unassigned nodes, a first unassigned node that represents an operation, which executes on a stream of the hardware accelerator, with the estimated amount of memory that maximizes usage of the first amount of memory; and assign an operation represented by the first unassigned node to the particular stream.

9. The method of claim 1, wherein the instructions cause the first device to determine a particular operation represented by a node has finished at a particular stream:

in response to determining the particular operation has finished:

determine at least one subsequent operation that uses the output of the particular operation as input; and reuse memory allocated for the output of the particular operation after the at least one subsequent operation has executed.

10. The method of claim 9, wherein determining at least one subsequent operation that uses the output of the particular operation as input includes:

determining that at least two subsequent operations, a first subsequent operation in a first stream and a second subsequent operation in a second stream, use the output of the particular operation as input;

placing a first marker in a first stream that indicates when the first subsequent operation has used the particular operation as input;

placing a second marker in a second stream that indicates when the second subsequent operation has used the particular operation as input;

determining that both operations have used the particular operation upon indication from the first and second markers.

11. A system for distributing a computation represented by a computational graph over a plurality of devices including a stream-based accelerator device and performing the computation including performing the computation represented by a subgraph of the computational graph on streams of the stream-based accelerator device, the system comprising:

one or more computers; and computer-readable medium coupled to the one or more computers and having instructions stored thereon, which, when executed by the one or more computers, cause the one or more computers to perform operations comprising:

receiving, by a computational graph system, a request to perform a computation represented by a computational graph;

obtaining data representing multiple subgraphs of the computational graph, the computational graph comprising a plurality of nodes and directed edges, wherein each node represents a respective operation, wherein each directed edge connects a respective first node to a respective second node that represents an operation that receives, as input, an output of an operation represented by the respective first node;

assigning the multiple subgraphs to respective devices of a plurality of devices, including assigning a first subgraph to a first device by a placer in the computational graph system;

determining that the first device comprises a hardware accelerator having a plurality of streams, wherein each stream is an independent hardware queue that performs operations assigned to the stream in the order assigned;

in response to determining that the first device comprises a hardware accelerator having a plurality of streams, generating instructions that when executed by the first device cause the first device to:

assign the operation represented by each node in the first subgraph to a respective stream in the plurality of streams of the hardware accelerator, including identifying two operations that do not depend on each other and assigning the two operations to different streams, and assigning to a single stream a first operation that changes an internal state of the hardware in a way that must happen before a second operation executes and assigning the second operation to be performed in the single stream after the first operation is complete; and perform the operations represented by the nodes in the subgraph in accordance with the assignment;

providing the instructions and the data to the first device;

sending to the first device a request causing the first device to perform the operations represented by the nodes in the first subgraph;

obtaining from the first device outputs of operations performed by the first device;

causing the other devices of the plurality of devices to perform the operations of the subgraphs assigned to the other devices; and responding to the request to perform the computation with one or more outputs obtained from the plurality of devices.

12. The system of claim 11, wherein the request specifies identifying one or more particular outputs from one or more respective nodes in the subgraph, further comprising:

receiving, from the first device, the one or more particular outputs; and providing the one or more particular outputs to the client.

13. The system of claim 11, further comprising:

analyzing the first subgraph to identify a group of nodes in the first subgraph in a chain structure;

wherein the instructions cause the first device to assign the group of nodes to one stream.

14. The system of claim 11, wherein the assigning comprises:

analyzing the first subgraph to identify a first node in the first subgraph has a plurality of directed edges as outputs;

wherein the instructions cause the first device to assign, for each of the directed edges, a node to which the directed edge points to a unique stream of the hardware accelerator.

15. The system of claim 11, wherein the instructions cause the first device to determine, for each node, a respective amount of memory resources in the hardware accelerator consumed by the operation represented by the node based on the directed edges to the node, wherein the assigning is based at least on the respective amount of memory resources.

16. The system of claim 11, wherein the instructions cause the first device to determine a particular operation represented by a node has finished at a particular stream;

in response to determining the particular operation has finished:

determine a first amount of memory consumed by the particular operation that will be freed;

determine, for each of a group of unassigned nodes, a respective estimated amount of memory consumed by the unassigned node;

determine, from the group of unassigned nodes, a first unassigned node with the estimated amount of memory that maximizes usage of the first amount of memory; and assign an operation represented by the first unassigned node to the particular stream.

17. A computer program product encoded on one or more non-transitory computer storage media, the computer program product comprising instructions that when executed by a hardware accelerator having a plurality of streams cause the hardware accelerator to perform operations comprising:

receiving, by a computational graph system, a request to perform a computation represented by a computational graph;

obtaining data representing multiple subgraphs of the computational graph, the computational graph comprising a plurality of nodes and directed edges, wherein each node represents a respective operation, wherein each directed edge connects a respective first node to a respective second node that represents an operation that receives, as input, an output of an operation represented by the respective first node;

assigning the multiple subgraphs to respective devices of a plurality of devices, including assigning a first subgraph to a first device by a placer in the computational graph system;

determining that the first device comprises a hardware accelerator having a plurality of streams, wherein each stream is an independent hardware queue that performs operations assigned to the stream in the order assigned;

in response to determining that the first device comprises a hardware accelerator having a plurality of streams, generating instructions that when executed by the first device cause the first device to:

assign the operation represented by each node in the first subgraph to a respective stream in the plurality of streams of the hardware accelerator, including identifying two operations that do not depend on each other and assigning the two operations to different streams, and assigning to a single stream a first operation that changes an internal state of the hardware in a way that must happen before a second operation executes and assigning the second operation to be performed in the single stream after the first operation is complete; and perform the operations represented by the nodes in the first subgraph in accordance with the assignment;

providing the instructions and the data to the first device;

sending to the first device a request causing the first device to perform the operations represented by the nodes in the first subgraph;

obtaining from the first device outputs of operations performed by the first device;

causing the other devices of the plurality of devices to perform the operations of the subgraphs assigned to the other devices; and responding to the request to perform the computation with one or more outputs obtained from the plurality of devices.

18. The computer program product of claim 17, wherein the request specifies identifying one or more particular outputs from one or more respective nodes in the subgraph, further comprising:

receiving, from the first device, the one or more particular outputs; and providing the one or more particular outputs to the client.

19. The computer program product of claim 17, further comprising:

analyzing the first subgraph to identify a group of nodes in the first subgraph in a chain structure;

wherein the instructions cause the first device to assign the group of nodes to one stream.

20. The computer program product of claim 17, wherein the assigning comprises:

analyzing the first subgraph to identify a first node in the first subgraph has a plurality of directed edges as outputs;

wherein the instructions cause the first device to assign, for each of the directed edges, a node to which the directed edge points to a unique stream of the hardware accelerator.

21. The computer program product of claim 17, wherein the instructions cause the first device to determine, for each node, a respective amount of memory resources in the hardware accelerator consumed by the operation represented by the node based on the directed edges to the node, wherein the assigning is based at least on the respective amount of memory resources.

22. The computer program product of claim 17, wherein the instructions cause the first device to determine a particular operation represented by a node has finished at a particular stream;

in response to determining the particular operation has finished:

determine a first amount of memory consumed by the particular operation that will be freed;

determine, for each of a group of unassigned nodes, a respective estimated amount of memory consumed by the unassigned node;

determine, from the group of unassigned nodes, a first unassigned node with the estimated amount of memory that maximizes usage of the first amount of memory; and assign an operation represented by the first unassigned node to the particular stream.

23. A method for distributing a computation represented by a computational subgraph over a plurality of streams of a stream-based accelerator device and performing the computation including performing the computation represented by the subgraph on streams of the stream-based accelerator device, the method comprising:

receiving, by a hardware accelerator having a plurality of streams, data representing a subgraph of a computational graph, the computational graph comprising a plurality of nodes and directed edges, wherein each node represents a respective operation, wherein each directed edge connects a respective first node to a respective second node that represents an operation that receives, as input, an output of an operation represented by the respective first node, the subgraph assigned to a hardware accelerator by a placer in a computational graph system, wherein each stream of the plurality of streams is an independent hardware queue that performs operations assigned to the stream in the order assigned;

assigning, by the hardware accelerator, the operation represented by each node in the subgraph to a respective stream in the plurality of streams of the hardware accelerator, including identifying two operations that do not depend on each other and assigning the two operations to different streams, and assigning to a single stream a first operation that changes an internal state of the hardware in a way that must happen before a second operation executes and assigning the second operation to be performed in the single stream after the first operation is complete;

performing, by the hardware accelerator, the operations represented by the nodes in the subgraph in accordance with the assignment;

receiving a request identifying one or more particular outputs from one or more respective nodes in the subgraph; and providing the one or more particular outputs to a client.

24. The method of claim 23, further comprising:

receiving data identifying a group of nodes in the subgraph in a chain structure; and assigning the group of nodes to one stream.

25. The method of claim 23, wherein the assigning comprises:

receiving data identifying a first node in the subgraph having a plurality of directed edges as outputs; and assigning, for each of the directed edges, a node to which the directed edge points to a unique stream of the hardware accelerator.

26. The method of claim 23, further comprising determining, for each node, a respective amount of memory resources in the hardware accelerator consumed by the operation represented by the node based on the directed edges to the node, wherein the assigning is based at least on the respective amount of memory resources.

27. The method of claim 23, further comprising determining a particular operation represented by a node has finished at a particular stream;

in response to determining the particular operation has finished, determining a first amount of memory consumed by the particular operation that will be freed;

determining, for each of a group of unassigned nodes, a respective estimated amount of memory consumed by the unassigned node;

determining, from the group of unassigned nodes, a first unassigned node with the estimated amount of memory that maximizes usage of the first amount of memory; and assigning an operation represented by the first unassigned node to the particular stream.

* * * * *